United States Patent
Arakawa et al.

(10) Patent No.: US 7,002,314 B2
(45) Date of Patent: Feb. 21, 2006

(54) ELECTRIC BRAKE SYSTEM

(75) Inventors: Haruo Arakawa, Toyota (JP);
Takahisa Yokoyama, Anjo (JP);
Takayuki Takeshita, Anjo (JP)

(73) Assignee: ADVICS Co., Ltd., Aichi (JP)

( * ) Notice: Subject to any disclaimer, the term of this patent is extended or adjusted under 35 U.S.C. 154(b) by 0 days.

(21) Appl. No.: 10/898,987

(22) Filed: Jul. 27, 2004

(65) Prior Publication Data

US 2005/0046368 A1     Mar. 3, 2005

(30) Foreign Application Priority Data

Aug. 25, 2003   (JP)  ............... 2003-299894

(51) Int. Cl.
*B60T 13/74*     (2006.01)
(52) U.S. Cl. .................. 318/610; 318/566; 318/632
(58) Field of Classification Search ........... 318/566, 318/609, 610, 619, 625, 626, 632, 671; 388/902, 388/907.5, 930; 303/167, 168, 20
See application file for complete search history.

(56) References Cited

U.S. PATENT DOCUMENTS

| | | | | |
|---|---|---|---|---|
| 3,707,310 A | * | 12/1972 | Sharp | ............... 303/195 |
| 3,762,774 A | * | 10/1973 | Burckhardt et al. | ........ 303/176 |
| 4,568,863 A | * | 2/1986 | Ruof | ............... 318/269 |
| 6,325,469 B1 | * | 12/2001 | Carson et al. | ............... 303/140 |
| 6,382,740 B1 | * | 5/2002 | Peichl et al. | ........... 303/122.08 |

FOREIGN PATENT DOCUMENTS

| | | |
|---|---|---|
| JP | A-6-72312 | 3/1994 |
| JP | A-2003-104195 | 4/2003 |

\* cited by examiner

*Primary Examiner*—Bentsu Ro
(74) *Attorney, Agent, or Firm*—Posz Law Group, PLC

(57) ABSTRACT

The present invention provides an electric brake system which detects the occurrence of overshooting, and corrects a feedback gain in the PID feedback control at overshooting. For example, it increases a differential gain Kd. Accordingly, a damping force increases from the time when the overshooting is determined, and after the overshooting, the output of an electric brake moderately decays to get closer to the target value with the passage of time.

20 Claims, 4 Drawing Sheets

ELECTRIC BRAKE SYSTEM

CROSS REFERENCE TO RELATED APPLICATION

This application is based upon and claims the benefit of Japanese Patent Application No. 2003-299894 filed on Aug. 25, 2003, the content of which are incorporated herein by reference.

FIELD OF THE INVENTION

This invention relates to an electric brake system for electrically controlling brake pressure corresponding to the amount of operation of the brake operating member.

BACKGROUND OF THE INVENTION

Among conventional anti-skid control (ABS) apparatuses that increase/decrease the fluid-chamber capacity by means of linear movement caused by an electric motor, one proposed apparatus is a type in which an instruction current supplied to the motor is determined in accordance with a state variable corresponding to a motor speed as well as a tire slip rate (see Japanese Patent Application Laid-open No. HEI6-72312). This apparatus determines the instruction current supplied to the motor anticipating the speed energy provided by the motor in order to suppress the output from the actuator from overshooting a target value.

Further, in a linear electric disc brake which is operated by means of linear movement caused by an electric motor, an upper limit and a lower limit of the rotational speed of the motor are predetermined and the actual rotational speed of the motor is suppressed within the predetermined range (see Japanese Patent Application Laid-open No. 2003-104195).

However, in the apparatus disclosed in Japanese Patent Application Laid-open No. HEI6-72312, the higher the rotational speed of the motor is, that is, the faster the response is, the larger the resistance force (damping force) against the motor rotation becomes. Hence, the best use of the potential of the motor is not made. Accordingly, the following-up of the target value of the actuator output by the actual control variable delays, leading to a poor response.

In the brake apparatus disclosed in Japanese Patent Application Laid-open No. 2003-104195, suppression on the rotational speed of the motor makes it impossible to adequately use the potential of the motor. Accordingly, the following-up of the target value of the actuator output by the actual control variable delays, leading to a poor response.

Therefore, any apparatus used for brake control such as the two apparatuses disclosed in the related art is incapable of providing the response required for the brake control.

On the other hand, if the adjustment of the instruction current in accordance with the rotational speed of the motor or the setting of an upper limit and lower limit of the rotational speed of the motor is not executed, as in the cases of both apparatuses disclosed above in the related art, this may make it possible to provide a response corresponding to the potential of the motor. However, it is impossible to suppress an overshoot in which the output from the actuator exceeds or surpasses the target value, and/or hunting in which the output from the actuator attempts to converge on the target value resulting in oscillation phenomenon. For this reason, a phenomenon where a large brake force is generated once and then rapidly drops occurs. This phenomenon causes a driver to feel uncomfortable with braking, whereby a stable riding comfort is not provided.

SUMMARY OF THE INVENTION

It is therefore an object of the present invention to provide an electric brake system which is capable of making use of the potential of a motor to improve response, and also suppressing overshooting and hunting so as to offer drivers stable riding comfort.

An electric brake system using an electric motor to operate an electric brake according to an aspect of the present invention, a target value setting portion sets a target value for an output from the electric brake for generating a target brake force corresponding to the amount of operation of a brake operating member. Further, a feedback control portion executes a feedback control to provide feedback on an actual control variable for the electric brake and to reduce a difference between the target value and the actual control variable. When the electric brake is operated so as to produce the target output value, if an overshoot detection portion detects overshooting, a feedback control variable correction portion corrects a feedback control variable in the feedback control portion.

For example, the feedback control portion may execute the feedback control based on PID. Further, the feedback control variable correction portion corrects a feedback gain in the feedback control portion, and increases a differential gain when the overshooting is detected, as compared with before the overshooting is detected.

Alternatively, the feedback control portion executes the feedback control based on PID, and the feedback control variable correction portion corrects the feedback gain in the feedback control portion. When the overshooting is detected, the feedback control variable correction portion remains a differential gain unchanged, and decrease a proportion gain and an integral gain as compared with before the overshooting is detected.

In this manner, at the time of overshooting, the feedback control variable correction portion corrects the feedback control variable in the feedback control. For example, it corrects a feedback gain in the PID feedback control. Accordingly, a damping force increases from the time of determining that the overshooting occurs, and after the overshooting, the output from the electric brake moderately decays and gets closer to the target value.

Accordingly, it is possible to allow the actual control variable for the electric brake to follow the target value with a good response. Furthermore, it is possible to suppress the oscillation phenomenon which generally subsequently occurs due to inertia and elasticity of the motor or the electric brake after the following-up of the target value, and therefore to maintain the stable output state. This in turn makes it possible to make use of the potential of the motor, improve response, and suppress overshooting and hunting. Further, because it is possible to eliminate, for example, feeling of acceleration/deceleration contrary to the driver's intention, the electric brake system is capable of offering stable riding comfort to the driver and also avoiding the functional depression, functional abnormality in the vehicle stability control.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
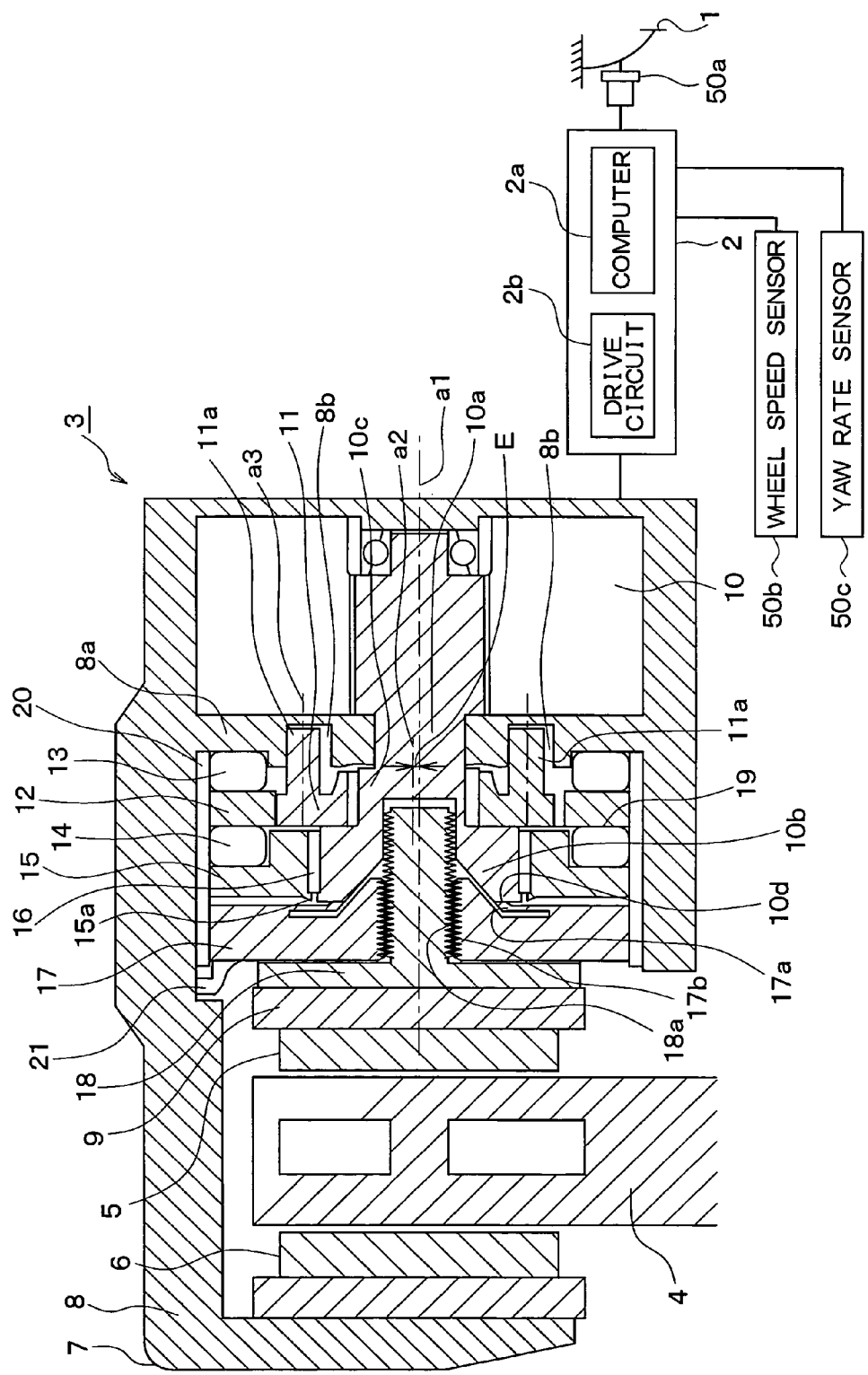
FIG. 1 is a schematic diagram illustrating an outline of a structure of an electric brake system according to a first embodiment of the present invention.

The present invention will be described further with reference to various embodiments in the drawings.

First Embodiment

FIG. 1 illustrates an outline of a structure of an electric brake system to which an embodiment according to the present invention is applied. Hereafter, the structure of the electric brake system will be described with reference to FIG. 1.

The electric brake system includes a brake pedal 1 corresponding to a brake operating member, an electronic control unit (hereinafter referred to as "ECU") 2, an electric brake 3 for generating a brake force on each wheel, various sensors 50a to 50c, and the like. The electric brakes 3 are mounted on the respective four wheels, but FIG. 1 representatively illustrates only one of the electric brakes 3 mounted on the four wheels.

To the brake pedal, 1 a pedal operating sensor 50a is attached for detecting an operation amount of the brake pedal 1, e.g., the pedal depression force or the amount of stroke. A detection signal is sent from the pedal operating sensor 50a to the ECU 2.

The ECU 2 is equipped with a computer 2a, a drive circuit 2b and the like. The ECU 2 receives detection signals from the pedal operating sensor 50a, the wheel speed sensor 50b provided for each wheel, and the yaw-rate sensor 50c, and uses the received detection signals to execute various types of operations. To be more specific, the ECU 2 uses the computer 2a to obtain a target brake force to be generated by the electric brake 3, that is, to obtain a target value for an instruction current in accordance with a target deceleration to be generated for the vehicle, and outputs the instruction current equivalent to the obtained target value from the drive circuit 2b.

The electric brake 3 is a disc brake and has a disc rotor 4 rotating in conjunction with the wheel, a pair of friction pads 5 and 6, that is, the first and second brake pads, which are placed on both sides of the disc rotor 4 so as to sandwich it, and a caliper 7 which straddles the disc rotor 4 and holds the pair of friction pads 5 and 6. The caliper 7 is structured as follows.

A motor 10 having a rotating shaft 10a is secured inside a housing 8 forming the outside shape of the caliper 7. The housing 8 incorporates components for pressing the first and second brake pads 5 and 6 onto the disc rotor 4.

An inner rotor 11 with an outer-tooth portion is secured on the rotating shaft 10a of the motor 10. An outer rotor 12 is placed around the inner rotor 11 and has an inner-tooth portion meshed with the outer-tooth portion of the inner rotor 11. Roller bearings 13 and 14 are placed on both end faces of the outer rotor 12. A clutch release member 15 is placed so as to be adjacent to the roller bearing 14, and has a hole formed in a central portion thereof. A bearing 16 is provided between an inner wall face of the hole and an outer circumferential face of the rotating shaft 10a of the motor 10. Note that, hereafter, the direction of the axis center of the rotating shaft 10a of the motor 10 is referred to simply as "the axial direction", and the direction of rotation of the rotating shaft 10 is referred to as "the circumferential direction". Further the direction of movement from the motor 10 toward the disc rotor 4 is referred to as "the forward direction" and the reverse direction is referred to as "the backward direction".

On the disc rotor 4 side of a distal end portion 10b of the rotating shaft 10a of the motor 10, a female screw member 17 is placed and provided with a clutch member 17a which is in contact with the end face of the distal end portion lob of the rotating shaft 10a. A female-screw hole 17b is formed in a central portion of the female screw member 17 and a male screw 18a is screwed thereinto. The male screw 18a is formed as a part of a male screw member 18 provided for securing a friction-material holding portion 9 holding the first brake pad 5.

The rotating shaft 10a of the motor 10 rotates around an axis center a1. An eccentric rotation portion 10c is formed on the rotating shaft 10a and has an axis center a2 positioned away from the axis center a1 by the amount of eccentricity E.

The eccentric rotation portion 10c provided on the motor rotating shaft 10a; the inner rotor 11 rotated around the axis center a1 by the rotation of the eccentric rotation portion 10c; a pin hole 8b formed in a motor accommodating wall 8a of the housing 8; and the outer rotor 12 form a cyclo-speed-reducer mechanism.

In the cyclo-speed-reducer mechanism, the eccentric rotation portion 10c serving as an input shaft is rotated by applying electricity to the motor 10. At this time, inner pins 11a provided on the inner rotor 11 are restrained from moving by the pin hole 8b so as to be capable of moving only within the pin hole 8b. Therefore, by the rotation of the eccentric rotation portion 10c, an axis center a3 of each inner pin 11a revolves inside the pin hole 8b and the inner rotor 11 revolves at a certain RPM around the axis center a2. The RPMs of the revolution of the inner pin 11a and the inner rotor 11 at this point are equivalent to the rotational speed of the motor 10.

The revolution of the inner rotor 11 is transmitted to the outer rotor 12. Then the outer rotor 12 rotates in the circumferential direction at a gear ratio which is determined on the basis of the number of teeth of the inner-tooth portion of the outer rotor 12 and the number of teeth of the outer-tooth portion of the inner rotor 11. At this point, because the outer rotor 12 is sandwiched between the roller bearings 13 and 14, the rotating position of the outer rotor 12 in the axial direction is fixed.

Further, ramp portions 19, the roller bearing 14 and the clutch release member 15 form a ramp mechanism.

A plurality of ramp portions 19 are provided on the end face of the outer rotor 12 on the side of the bearing 14, and formed along the circumferential direction of the outer rotor 12 so as to be inclined at a predetermined angle with respect to the end face of the outer rotor 12, which is not shown in FIG. 1. Hence, when the ramp portion 19 rotates with the rotation of the outer rotor 12, the roller bearing 14 and the clutch release member 15 are urged toward the left side of the drawing of FIG. 1 by this inclination of the ramp portion 19.

The clutch release member 15 is formed of a ring-shaped member the outer circumference thereof is in contact with a bearing 20 and the inner circumference thereof is in contact via the bearing 16 with the end portion 10b of the motor rotating shaft 10a. Hence, in the circumferential direction and axial direction, the clutch release member 15 can slide inside the housing 8. However, the clutch release member 15 is positioned in contact with the roller bearing 14 on the face which is perpendicular to the axial direction, so as to be inhibited from moving toward the roller bearing 14. Further, the clutch release member 15 is provided with a circle shaped projection 15a on the face thereof opposite to the outer rotor 12. The projection 15a is placed in contact with the clutch member 17a provided on the female screw member 17 in the axial direction.

In the ramp mechanism structured in this manner, the rotation of the outer rotor 12 is transmitted via the roller bearing 14 to the clutch release member 15. Then, while the clutch release member 15 is out of contact with the female screw member 17 (clutch member 17a), the clutch release member 15 rotates integrally with the roller bearing 14 and the outer rotor 12 at the same speed in the circumferential direction.

Then, the projection 15a of the clutch release member 15 comes into contact with the female screw member 17 (clutch member 17a) and the restraining force acts on the clutch release member 15. Thereupon, a speed differential in rotational speed in the circumferential direction is produced between the clutch release member 15 and the outer rotor 12. Hence, the relative displacement between the clutch release member 15 and the outer rotor 12 in the axial direction is increased in accordance with the speed differential and the inclined angle of the ramp portion 19. Thus the clutch release member 15 moves towards the left in FIG. 1.

The female screw member 17 is able to rotate relatively with respect to the housing 8, and is provided with a plurality of clutch members 17a capable of coming in and out of contact with the shaft end portion 10b of the motor rotating shaft 10a.

The clutch members 17a are arranged in plurality in the circumferential direction, and each extend in the direction of the center of the female screw member 17. When the end portion of the clutch member 17a is in contact with the shaft end portion 10b at a contact portion 10d, the rotation of the motor rotating shaft 10a is transmitted to the female screw member 17 because of a friction force generated on the contact portion 10d, and thus the female screw member 17 rotates in the circumferential direction. Accordingly, because the male screw member 18 is inhibited from rotating in the circumferential direction, the male screw member 18 moves in the axial direction by the rotation of the female screw member 17, and presses the first brake pad 5 onto the disc rotor 4.

Note that, a one-way clutch 21 permitting the female screw member 17 to rotate only in one direction is provided on the outer circumferential portion of the female member 17, so as to engage with the housing 8. The one-way clutch 21 permits the rotation of the female screw member 17 in the direction that thrusts the first brake pad 5 and blocks the rotation thereof in the reverse direction. For this reason, when releasing the brake, the direction of rotation of the female screw member 17 is not reversed. Accordingly, even if wearing of the first brake pad 5 develops, it is possible to prevent the space between the first brake pad 5 and the disc rotor 4 from exceeding a predetermined value.

Further, the male screw member 18 is inhibited from moving in the circumferential direction and is capable of moving only in the axial direction. One end of the male screw member 18 is joined to the friction-material holding portion 9 holding the first brake pad 5, and at the other end thereof a male screw 18a is formed. The male screw 18a is located to be screwed into the female screw 17b of the female screw member 17, so that the axis center thereof is aligned with the axis center al of the motor rotating shaft 10a.

With the electric brake 3 structured as described hitherto, when the instruction current determined by the ECU 2 is output from the drive circuit 2b, the motor 10 receives the instruction current and is driven. Accordingly, as the motor rotating shaft 10a is rotated, the male screw member 18 is urged toward the left side of the drawing of FIG. 1, to cause the first brake pad 5 to come into contact with the disc rotor 4. Then, upon contact of the first brake pad 5 with the disc rotor 4, the male screw member 18 is incapable of moving any further toward the left side of the drawing, so that the entire caliper 7 is urged toward the right side of the drawing of FIG. 1 by the urging force of the male screw member 18 toward the left side of the drawing to bring the second brake pad 6 into contact with the disc rotor 4. In this manner, the disc rotor 4 is clamped between the first and second brake pads 5 and 6, and a friction force is applied to the disc rotor 4 so as to stop the rotation. Thus, the rotation of the wheel in conjunction with the disc rotor 4 is stopped, and a brake force is obtained by a friction force generated between the tire mounted on the wheel and the road surface.

Figure 2:
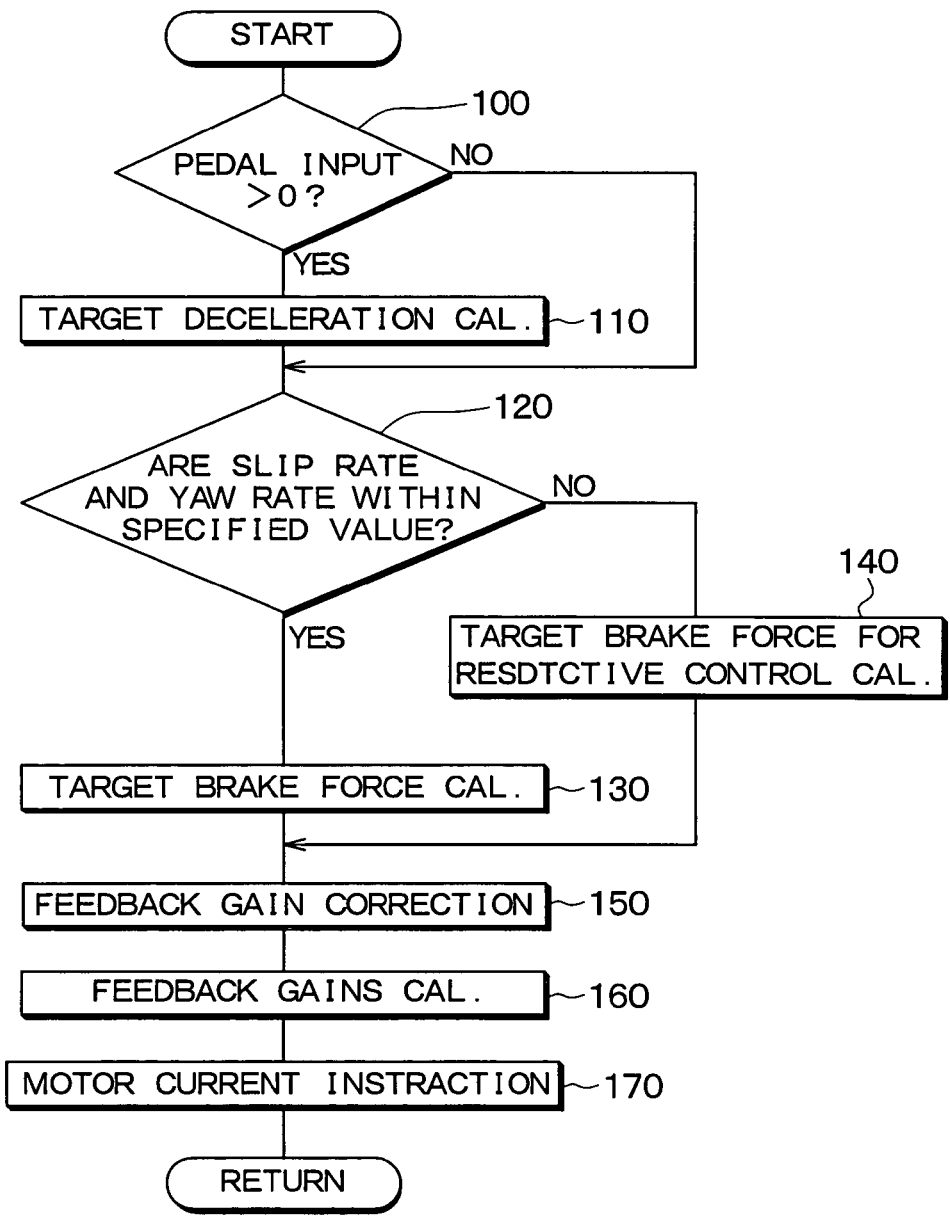
FIG. 2 is a flow chart of instruction current setting processing which is executed by the electric brake system shown in FIG. 1.

The foregoing electric brake system executes the processing of setting an instruction current to be applied to the motor 10 of the electric brake 3. FIG. 2 shows a flow chart of the processing of setting the instruction current executed by the ECU 2. The instruction current setting processing is described with reference to FIG. 2.

The instruction current setting processing shown in the flow chart in FIG. 2 is executed whenever the ignition switch (not shown) is turned on. First, at 100 in FIG. 2, the determination whether a pedal input is produced or not is made. This determination of the processing is made on the basis of a signal from the pedal operating sensor 50a which is indicative of whether or not the brake pedal 1 is operated.

Then, if the determination that a pedal input is produced is made, the procedure proceeds to processing at 110 to calculate, on the basis of the signal from the pedal operating sensor 50a, a target deceleration in accordance with the pedal input, namely, the pedal depression force, pedal speed or the like. Then the procedure proceeds to processing at 120. On the other hand, if there is no pedal input, it means there is no brake request from the driver. Therefore, the procedure proceeds directly to processing at 120.

At 120, the determination is made whether or not a slip rate calculated on the basis of a detection signal from the wheel speed sensor 50b and a yaw rate calculated on the basis of a detection signal from the yaw rate sensor 50c fall within specified value ranges. The "specified value" referred to herein means the degree of slip rate or yaw rate allowing the ABS control, vehicle stability control and the like to be executed.

Then, if an affirmative determination is made at 120, it is assumed that the ABS control, vehicle stability control and the like are not executed, and the procedure proceeds to processing at 130. On the other hand, if a negative determination is made, it is assumed that the ABS control, vehicle stability control and the like are executed, and the procedure proceeds to processing at 140.

Note that, regarding the slip rate and the yaw rate, the operation for obtaining the slip rate and/or the yaw rate is generally executed in separated processing for executing ABS control and the like. Therefore, in the first embodiment, those operation results are used.

A target brake force is calculated for each wheel at 130. More specifically, the brake force for each wheel required for achieving the target deceleration which has been obtained at 120 is calculated. Further, a target value for an output from the electric brake 3 in accordance with the target brake force is set. The target value serves as a target control variable which is required to be output to the electric brake 3 by the ECU 2. On the other hand, at 140, in order to execute the ABS control, vehicle stability control and/or the like, a target brake force for each wheel in accordance with each of the above controls is calculated, and a target value for an output from the electric brake 3 in accordance with the calculated target brake force is calculated.

Figure 3:
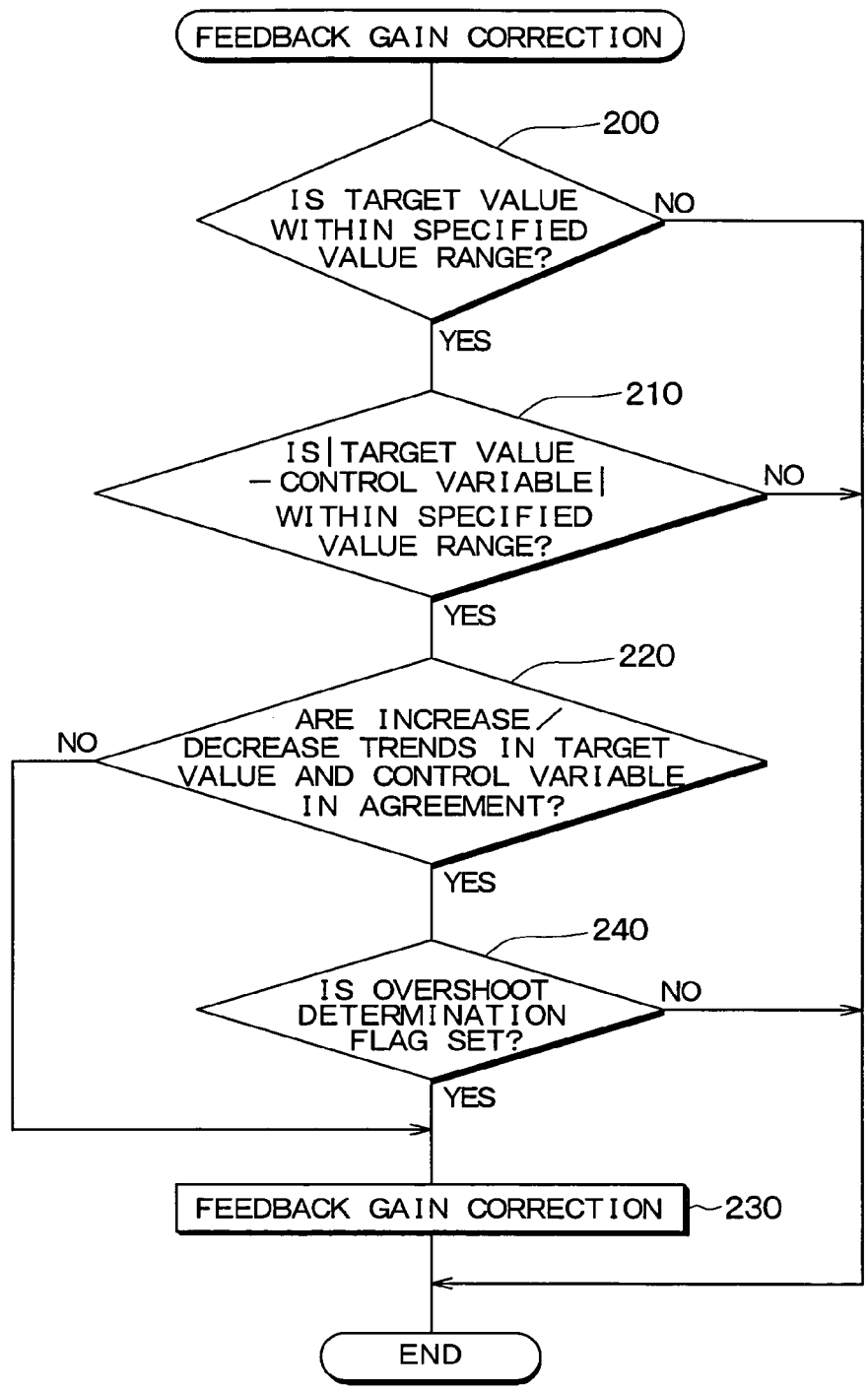
FIG. 3 is a flow chart showing in detail feedback gain correction processing shown in FIG. 2.

Then, at 150, the ECU 2 executes feedback gain correction processing as correction for a feedback control variable. The feedback gain correction processing is executed for correction of the target value of the output from the electric brake 3, with the objective of preventing the occurrence of overshooting or hunting in the instruction current. FIG. 3 shows a flow chart representing the feedback gain correction processing in detail. The following description is given of the feedback gain correction processing with reference to FIG. 3.

In the feedback gain correction processing, first, at 200 in FIG. 3, the determination is made whether or not the amount of variation in target value falls within a specified value range (first specified value range). For example, the determination is made whether or not the amount of the changes when the target value for the output from the electric brake 3 is converted to a deceleration, that is, the amount of the changes in deceleration which will be produced when the electric brake 3 produces an output corresponding to the target value, falls within ±0.1 G/sec. Thus, it is possible to determine whether or not the target value falls within a stable state. The state in which the target value is stable as defined herein means a state in which the target value increases at a predetermined gradient to reach the required value and then is retained at a substantially constant value.

Accordingly, when the amount of variation in the target value is large and the target value falls out of the stable state, the state is not in a stage where overshooting or hunting occurs. Thus, without any processing, the feedback gain correction processing is terminated. On the other hand, when the amount of variation in the target value is small and the target value still falls within the stable state, the determination is made that the state is in a stage where overshooting occurs and will be shifted to hunting, and the procedure proceeds to processing at 210.

At 210, the absolute value (|target brake force−control variable|) of the difference between the target value for the output from the electric brake 3 and the control variable (output) actually generated is obtained, and then the determination is made whether or not the absolute value of the difference falls within another specified value range (second specified value range). For example, the determination is made whether, when the absolute value of the difference is converted into a deceleration, the deceleration is within a 0.1 G or not. That is, even if the target brake force is in the stable state, when the control variable actually generated differs greatly from the target value, feedback gain correction processing must not be executed in order to make the actual control variable approximate to the target brake force. Accordingly, if an affirmative determination is made at 210, the procedure proceeds to processing at 220. If a negative determination is made, without any processing, the feedback gain correction processing is terminated.

At 220, the determination is made whether or not increase/decrease trends in the target value for the output from the electric brake 3 and those in the control variable actually generated are in agreement. In this connection, the determination is made, regarding the "increase/decrease trends" referred to herein, it is assumed that when the target value and/or the actual control variable is in the stable state after an increase or after a decrease, the trend of the target value and/or the actual control variable before entering the stable state is continued without change.

When both the target value and the actual control variable are on the increase trend or on the decrease trend, this means the state before any overshooting or hunting occurs, or alternatively the state in which the increase/decrease trends are in agreement with each other again after overshooting or hunting has occurred. Further, when the target value for the output from the electric brake 3 and the actual control variable are not in agreement with each other in increase/decrease trends, this means the state in which the brake system goes into oscillation mode caused by hunting after overshooting has occurred.

Hence, if a negative determination is made at 220, it is assumed that after overshooting has occurred, and the brake system goes into the oscillation mode caused by hunting, the ECU 2 sets an overshoot determination flag and the procedure proceeds to processing at 230. Then, the feedback gain correction is executed. More specifically, when overshooting occurs, correction is made for a feedback gain in the feedback control based on PID executed at 160 in FIG. 2, which will be described later.

Here, the PID feedback control is described. The term "PID" is an acronym for "Proportion", "Integral" and "Differential", and refers to execution of the proportion, integral and differential controls in such a way that feedback is executed on the actual control variable with respect to the target value and the difference between the actual control variable and target value becomes zero. The PID feedback control can be illustrated as in FIG. 4.

Figure 4:
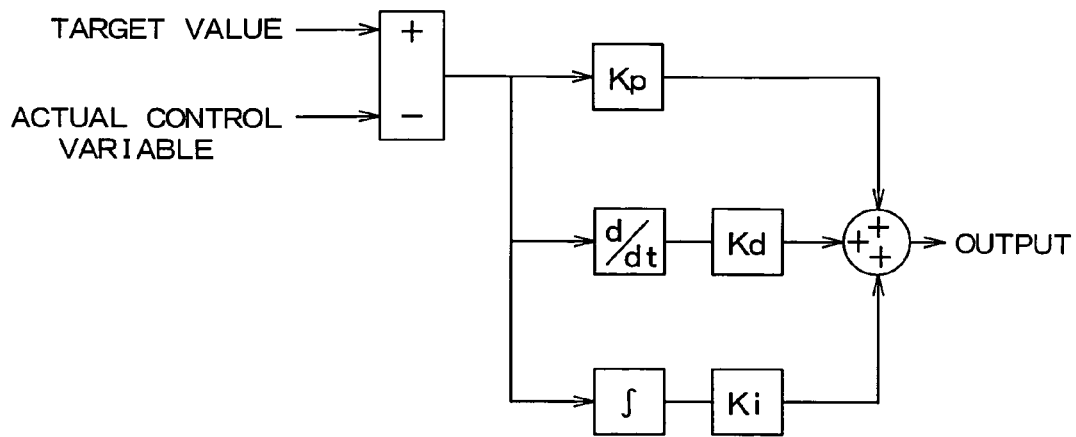
FIG. 4 is a block diagram for a feedback control based on PID.

As shown in FIG. 4, the above controls are individually executed on the difference between the target value and the actual control variable to determine feedback gains (proportion gain Kp, integral gain Ki and differential gain Kd).

In the proportion control, a control input is executed proportional to the difference (error) between the target value and the actual control variable. When executing such a control, the control gain may possibly be raised in order to increase the response speed, but this makes the actual control variable oscillational. Therefore, even in the zero state of the difference between the target value and the actual control variable, the integral control makes it possible to maintain the state of the difference. The integral term increases with time.

The execution of these proportional and integral controls makes it possible to come close to the target. However, it takes a long time to come close to the target and the response speed is slowed down. Hence, the differential control is executed to increase the control input when a large difference between the target value and the actual control variable is produced, and to decrease the control input when a small difference is produced. Accordingly, it becomes possible to bring the actual control variable closer to the target for stability.

Because of this, the first embodiment employs a PID feedback control to make the actual control variable approximate to the target value, in which a proportion gain Kp, an integral gain Ki and a differential gain Kd are preset as values determined in view of response and the like.

Accordingly, at 160 in FIG. 2, the correction, for example, increasing the differential gain Kd of the feedback gains set as described above and making no change to the proportion gain Kp and the integral gain Ki is executed.

On the other hand, if an affirmative determination is made at 220, the procedure proceeds to processing at 240 to determine whether a present state is the state before any overshooting or hunting occurs or the state in which hunting introduces oscillation mode after overshooting has occurred once, and then the increase/decrease trends are in agreement with each other again. The determination in this processing is dependent on whether or not the overshoot determination flag having been set at 220 is set.

Even if the target value for the output from the electric brake 3 and the actual control variable are once in agreement with each other in increase/decrease trends after overshooting has occurred and then hunting has introduced oscillation mode, there is a necessity to subsequently continue executing the feedback gain correction. Hence, if the overshoot determination flag is set, the determination is made that there is a necessity to continue still executing the feedback gain correction, and the procedure proceeds to processing at 230 to execute the feedback gain correction as in the above case.

Note that, if a negative determination is made at 200 or at 210, the determination is made that there is no necessity any further to execute the feedback gain correction, or alternatively that circumstances require executing first of all the setting of the target brake force in accordance with the pedal input. Therefore, the overshoot determination flag is reset.

In this manner, the feedback gain correction processing is terminated. After that, the procedure proceeds to processing at 160 in FIG. 2 to obtain a difference between the target value for the output from the electric brake 3 and the actual control variable. Then, the PID feedback control in which the target value is adjusted so as to decrease the obtained difference is executed.

Then, by converting the target value for the output from the electric brake 3 into the corresponding instruction current, the setting of the instruction current is completed. Then, the set instruction current is output from the ECU 2 to the motor 10, and thus the electric brake 3 produces the output to be equivalent to the set target value.

Figure 5:
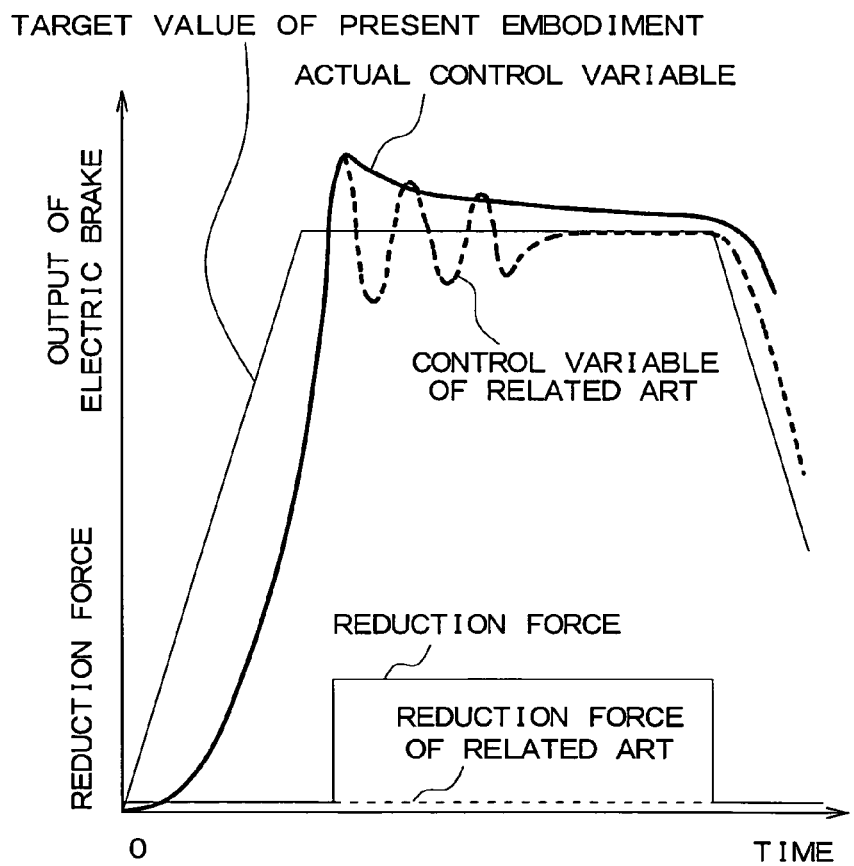
FIG. 5 is a timing chart illustrating an operation of the electric brake system shown in FIG. 1.

FIG. 5 shows changes in the target value for the output from the electric brake 3 and the actual control variable in the electric brake system in which the foregoing processing is executed. Note that the dotted line in FIG. 5 indicates conventional changes in a target value and an actual control variable when the aforementioned feedback gain correction processing is not executed, for reference purposes.

As shown in FIG. 5, the target value for the output from the electric brake 3 increases up to a value corresponding to the required target brake force with a predetermined increasing gradient. With following this target value, the actual control variable increases rapidly. However, due to the influence of inertia and elasticity of the motor 10 and the like, the actual control variable increases up to a value corresponding to the required target brake force as in the case of the target value, and then overshoots this value.

For this reason, if the target control variable does not undergo the feedback gain correction processing as in the case of the conventional example, after inertia energy (speed energy) of the motor or the electric brake has completely replaced elastic energy, due to the stored elastic energy the actual control variable commences decreasing again toward the target value. This phenomenon is repeated to result in a damped oscillation phenomenon of the target control variable repeatedly moving up and down with respect to the target value and finally stabilizing at the target value.

However, in the first embodiment, if the overshooting is detected, the feedback gain is corrected. More specifically, the differential gain Kd is increased. Therefore, as shown in FIG. 5, the damping force starts increasing at the time when the overshooting is detected, and after the actual control variable has overshoot, the output from the electric brake 3 moderately decays to get closer to the target value with the passage of time with avoidance of the oscillation phenomenon as occurs in the conventional example.

Accordingly, it is possible to allow the actual control variable for the electric brake 3 to follow the target value with a good response. Furthermore, it is possible to suppress the oscillation phenomenon which is generally caused by inertia and elasticity of the motor 10 or the electric brake 3 after the following-up of the target value, and therefore to maintain the stable output state. This in turn makes it possible to make use of the potential of the motor, improve response, and suppress overshooting and hunting. Further, because it is possible to eliminate, for example, feeling of acceleration/deceleration contrary to the driver's intention, the electric brake system is capable of offering stable riding comfort to the driver and also avoiding the functional depression, functional abnormality in the vehicle stability control.

Note that because after the overshooting, the output from the electric brake 3 decays merely moderately from the value showing when overshooting, the target brake force required temporary and the actual brake force are not in agreement with each other. However, for example, a brake force larger than the target value is generated, and then the brake force is retained. Therefore, even when the brake force and the target value are not in agreement, the driver is not caused to feel a change in brake force which is contrary to the driver's intention. In other words, when hunting occurs, the brake force varies with oscillation twice the magnitude of the difference between the target value for the output from the electric brake 3 and an overshoot. Hence, a change in which, the brake force is sharply reduced after a large brake force is generated, is introduced and causes the driver to feel uncomfortable. However, in the first embodiment, a brake force slightly differing from the target brake force is retained, whereby the driver does not feel uncomfortable.

Further, if a permissible range is set for a difference between the required target brake force and the actual brake force, it is possible to further mitigate the driver's uncomfortable feeling.

OTHER EMBODIMENTS

In the first embodiment, even when the vehicle behavior control such as the ABS control and the like is executed, the target brake force for each wheel is calculated and the target value for the output from the electric brake 3 is calculated (at 140 in FIG. 2), and then the feedback gain correction processing is carried out (at 150 in FIG. 2). However, when the vehicle behavior control such as the ABS control and the like is executed actually, it is possible to give more priority to the vehicle behavior control such as the ABS control and the like and suspend execution of the feedback gain correction processing. In this case, for example, at the time when the vehicle behavior control is executed, a flag showing this execution may be set, and then the determination whether or not the vehicle behavior control is being executed may be made prior to the determination at 200 in FIG. 3. If the vehicle behavior control is executed, the feedback gain correction processing may be terminated without any processing.

Further, in the above second embodiment, the differential gain Kd is increased in the feedback gain correction processing. However, it is also possible to execute another correction processing in which the differential gain Kd is not changed and the proportion gain Kp and the integral gain Ki are decreased.

Note that each of the procedures of the flow charts describing the aforementioned procedure corresponds to a portion for implementing the processing executed in procedure.

While the above description is of the preferred embodiments of the present invention, it should be appreciated that the invention may be modified, altered, or varied without deviating from the scope and fair meaning of the following claims.

What is claimed is:

1. An electric brake system using an electric motor to operate an electric brake, comprising:
   a target brake force setting portion for setting a target brake force corresponding to the amount of operation of a brake operating member;
   a target value setting portion for setting a target value for an output of said electric brake for generating the target brake force set by said target brake force setting portion;
   a feedback control portion for executing a feedback control for providing feedback on an actual control variable for said electric brake, and minimizing a difference between said target value and the actual control variable;
   overshoot detection portions for operating said electric brake to produce the output of said target value from said electric brake, and detecting occurrence of overshooting when the actual control variable for the electric brake overshoots said target value; and
   a feedback control variable correction portion for correcting a feedback control variable in said feedback control portion when said overshoot detection portion detects the overshooting.

2. The electric brake system according to claim 1, wherein said overshoot detection portion has a portion for determining whether or not the amount of variation in said target value falls within a first specified value range, and when the determination that the amount of variation in said target value falls outside said first specified value range is made, it is determined that overshooting has not occurred.

3. The electric brake system according to claim 2, wherein said overshoot detection portion has a portion for determining whether or not the difference between said target value and said actual control variable falls within a second specified value range, and when the determination that the difference between said target value and said actual control variable falls outside said second specified value range, it is determined that overshooting has not occurred.

4. The electric brake system according to claim 3, wherein said overshoot detection portion has a portion for determining whether or not an increase/decrease trend in said target value and that in said actual control variable are in agreement with each other, and determines that said overshooting occurs when the increase/decrease trend in said target value and that in said actual control variable are not in agreement with each other.

5. The electric brake system according to claim 2, wherein said overshoot detection portion has a portion for determining whether or not an increase/decrease trend in said target value and that in said actual control variable are in agreement with each other, and determines that said overshooting occurs when the increase/decrease trend in said target value and that in said actual control variable are not in agreement with each other.

6. The electric brake system according to claim 2, further comprising
   a determination portion for determining that said overshooting has occurred if said overshoot detection portion has already detected said overshooting when said target value and said actual control variable are in agreement in an increase/decrease trend,
   wherein when said determination portion determines that said overshooting has been detected, said feedback control variable correction portion executes correction on said feedback control variable.

7. The electric brake system according to claim 2, wherein said feedback control portion executes the feedback control based on PID, and said feedback control variable correction portion corrects the feedback gain in said feedback control portion, and when said overshooting is detected, a differential gain is increased as compared with the differential gain shown before said overshooting is detected.

8. The electric brake system according to claim 2, wherein said feedback control portion executes the feedback control based on PID, and said feedback control variable correction portion corrects the feedback gain in said feedback control portion, and when said overshooting is detected, a differential gain is not changed and at least one of a proportion gain and an integral gain is decreased as compared with the gains shown before said overshooting is detected.

9. The electric brake system according to claim 1, wherein said overshoot detection portion has a portion for determining whether or not the difference between said target value and said actual control variable falls within a second specified value range, and when the determination that the difference between said target value and said actual control variable falls outside said second specified value range, it is determined that overshooting has not occurred.

10. The electric brake system according to claim 9, wherein said overshoot detection portion has a portion for determining whether or not an increase/decrease trend in said target value and that in said actual control variable are in agreement with each other, and determines that said overshooting occurs when the increase/decrease trend in said target value and that in said actual control variable are not in agreement with each other.

11. The electric brake system according to claim 9, further comprising
   a determination portion for determining that said overshooting has occurred if said overshoot detection portion has already detected said overshooting when said target value and said actual control variable are in agreement in an increase/decrease trend,
   wherein when said determination portion determines that said overshooting has been detected, said feedback control variable correction portion executes correction on said feedback control variable.

12. The electric brake system according to claim 9, wherein said feedback control portion executes the feedback control based on PID, and said feedback control variable correction portion corrects the feedback gain in said feedback control portion, and when said overshooting is detected, a differential gain is increased as compared with the differential gain shown before said overshooting is detected.

13. The electric brake system according to claim 9, wherein said feedback control portion executes the feedback control based on PID, and said feedback control variable correction portion corrects the feedback gain in said feedback control portion, and when said overshooting is detected, a differential gain is not changed and at least one of a proportion gain and an integral gain is decreased as compared with the gains shown before said overshooting is detected.

14. The electric brake system according to claim 1, wherein said overshoot detection portion has a portion for determining whether or not an increase/decrease trend in said target value and that in said actual control variable are in agreement with each other, and determines that said overshooting occurs when the increase/decrease trend in said target value. and that in said actual control variable are not in agreement with each other.

15. The electric brake system according to claim 14, further comprising a determination portion for determining that said overshooting has occurred if said overshoot detection portion has already detected said overshooting when said target value and said actual control variable are in agreement in the increase/decrease trends,
wherein when said determination portion determines that said overshooting has been detected, said feedback control variable correction portion executes correction on said feedback control variable.

16. The electric brake system according to claim 14, wherein said feedback control portion executes the feedback control based on PID, and said feedback control variable correction portion corrects the feedback gain in said feedback control portion, and when said overshooting is detected, a differential gain is increased as compared with the differential gain shown before said overshooting is detected.

17. The electric brake system according to claim 14, wherein said feedback control portion executes the feedback control based on PID, and said feedback control variable correction portion corrects the feedback gain in said feedback control portion, and when said overshooting is detected, a differential gain is not changed and at least one of a proportion gain and an integral gain is decreased as compared with the gains shown before said overshooting is detected.

18. The electric brake system according to claim 1, further comprising
a determination portion for determining that said overshooting has occurred if said overshoot detection portion has already detected said overshooting when said target value and said actual control variable are in agreement in an increase/decrease trend,
wherein when said determination portion determines that said overshooting has been detected, said feedback control variable correction portion executes correction on said feedback control variable.

19. The electric brake system according to claim 1, wherein said feedback control portion executes the feedback control based on PID, and said feedback control variable correction portion corrects the feedback gain in said feedback control portion, and when said overshooting is detected, a differential gain is increased as compared with the differential gain shown before said overshooting is detected.

20. The electric brake system according to claim 1, wherein said feedback control portion executes the feedback control based on PID, and said feedback control variable correction portion corrects the feedback gain in said feedback control portion, and when said overshooting is detected, a differential gain is not changed and at least one of a proportion gain and an integral gain is decreased as compared with the gains shown before said overshooting is detected.

* * * * *